US009191823B2

(12) United States Patent
Rieger et al.

(10) Patent No.: US 9,191,823 B2
(45) Date of Patent: Nov. 17, 2015

(54) MOBILE DEVICE AND METHOD TO MONITOR A BASEBAND PROCESSOR IN RELATION TO THE ACTIONS ON AN APPLICATON PROCESSOR

(71) Applicant: GSMK Gesellschaft fur sichere Mobile Kommunikation mbH, Berlin (DE)

(72) Inventors: Frank Rieger, Berlin (DE); Vadim Uvin, Berlin (DE)

(73) Assignee: GSMK Gesellschaft für sichere Mobile Kommunikation mbH, Berlin (DE)

( * ) Notice: Subject to any disclaimer, the term of this patent is extended or adjusted under 35 U.S.C. 154(b) by 230 days.

(21) Appl. No.: 13/918,695

(22) Filed: Jun. 14, 2013

(65) Prior Publication Data

US 2014/0004829 A1 Jan. 2, 2014

Related U.S. Application Data

(60) Provisional application No. 61/666,472, filed on Jun. 29, 2012.

(51) Int. Cl.
*H04M 3/16* (2006.01)
*H04W 12/12* (2009.01)

(52) U.S. Cl.
CPC .................................... *H04W 12/12* (2013.01)

(58) Field of Classification Search
CPC ......... H04W 8/16; H04W 8/24; H04W 12/08; H04W 12/10; H04W 12/12
USPC ............ 455/67.11, 410, 411; 713/12; 726/13, 726/14, 22, 23, 25
See application file for complete search history.

(56) References Cited

U.S. PATENT DOCUMENTS

| 2009/0254465 | A1 | 10/2009 | Oester |
| 2009/0260081 | A1 | 10/2009 | Johnson et al. |
| 2010/0031325 | A1* | 2/2010 | Maigne et al. ..................... 726/4 |
| 2010/0121916 | A1 | 5/2010 | Lin |
| 2010/0251370 | A1 | 9/2010 | Sun et al. |
| 2012/0096539 | A1* | 4/2012 | Hu et al. ......................... 726/13 |

FOREIGN PATENT DOCUMENTS

| DE | 10 2006 016994 A1 | 10/2007 |
| WO | WO 2007/118638 A2 | 10/2007 |

OTHER PUBLICATIONS

European Search Report dated Oct. 14, 2013 pertaining to European Patent Application No. EP 13167024.2.

* cited by examiner

*Primary Examiner* — Amancio Gonzalez
(74) *Attorney, Agent, or Firm* — Cooley LLP

(57) ABSTRACT

A method and device to analyze the security of a mobile terminal having application and baseband processors are described. Various information may be acquired by baseband and application monitor applications running on the mobile device including, for example, information about transmission channels, protocol transmissions, and/or data transmission volumes. Information about power consumption may also be acquired. The monitor applications may also measure response times to service requests as well as monitor various aspects of running applications including status, time/duration, inputs or outputs, and/or inputs from a user via a User-Interface. Information may also be acquired about the configuration of the audio path to determine which component or application is using the microphone.

30 Claims, 2 Drawing Sheets

MOBILE DEVICE AND METHOD TO MONITOR A BASEBAND PROCESSOR IN RELATION TO THE ACTIONS ON AN APPLICATON PROCESSOR

CROSS-REFERENCE TO RELATED APPLICATIONS

This application claims the benefit of U.S. Provisional Application No. 61/666,742 filed Jun. 29, 2012 entitled Mobile Device and Method to Monitor a Baseband Processor in Relation to the Action On An Application Processor, which is hereby incorporated by reference herein in its entirety.

FIELD OF THE INVENTION

The invention disclosed herein describes devices and methods to mitigate and prevent over-the-air attacks against the baseband processor of mobile devices by means of monitoring the baseband processor's behavior, correlating this behavior with the intentions of the user (as expressed by the behavior of the application processor), and taking appropriate countermeasures against attacks.

BACKGROUND OF INVENTION

Modern mobile devices (typically, mobile phones and tablet computers with cellular network connectivity) consist of at least two separate processors: The so called application CPU (Central Processing Unit), which runs the operating system, user interface and applications, and the so-called baseband CPU that runs all the necessary software to interface with the mobile network (e.g. GSM Global System for Mobile Communications, 3G, CDMA (Code Division Multiple Access), CDMA2000, UMTS Universal Mobile Telecommunications System, or LTE (Long Term Evolution).

A mobile application processor is a system on a chip designed to support applications running in a mobile operating system environment. The system on a chip can be physically independent from the baseband CPU as separate chip or can be implemented physically integrated into one chip together with the baseband CPU.

A mobile application processor provides a self-contained operating environment that delivers all system capabilities needed to support a device's applications, including memory management, graphics processing, and multimedia decoding.

Mobile application processors may be independent from other specialized processors in the same mobile device, such as a phone's baseband (wireless communications) processor.

Some vendors manufacture their own mobile application processors. Other vendors purchase their mobile application processors, using them as original equipment manufacturer (OEM) components. For example, the Qualcomm Snapdragon mobile application processor is contained in many smart phones that use Snapdragon to run the Android operating system and Android applications. In this way, every phone manufacturer need not develop its own mobile application processor (although they can); this approach reduces bill-of-materials cost and makes it possible to develop low-cost "smart" consumer electronics.

A wide variety of mobile devices contain mobile application processors, including feature phones, smartphones, tablets, eReaders, netbooks, automotive navigation devices, and gaming consoles.

A baseband processor (also known as baseband radio processor, BP, or BBP) is a device (a chip or part of a chip) in a network interface that manages all the radio functions (all functions that require an antenna). This may or may not include WiFi and/or Bluetooth. It typically uses its own RAM and firmware. This RAM can also be shared with the application processor.

The reasons for separating the baseband processor from the application CPU (known as the AP or Application Processor) are:
1. radio performance: radio control functions (signal modulation, encoding, radio frequency shifting, etc.) are highly timing dependant, and require a realtime OS.
2. legal: some authorities (e.g. the U.S. Federal Communications Commission (FCC)) require that the entire software stack running on a device which communicates with the cellular network must be certified. Separating the BP into a different component allows reusing them without having to certify the full AP.
3. radio reliability: Separating the BP into a different component ensures proper radio operation while allowing application and OS changes.

Baseband processors typically run a RTOS written in firmware: e.g. Nucleus RTOS (iPhone 3G/3GS/iPad), ENEA's OSE, VRTX, ThreadX (iPhone 4).

Significant baseband manufacturers include MediaTek, Broadcom, Icera, Intel Mobile Communications—former infineon wireless division, Qualcomm, ST-Ericsson.

The BP and the AP can communicate and exchange information. One possibility is to use shared memory, which is controlled by a memory controller or a memory management unit. In this context the terms memory controller and memory management are used to identify the same unit which has the functionality of a memory controller, of a memory management unit, or of both. The memory controller controls regions of the memory for the AP and the BP and in some areas concurrent access is possible by both the AP and the BP. Also a bus system is possible over which the AP and the BP exchange information. Also private memory sections with private memory controllers and a mutual memory controller for a shared area are possible solutions. There is also a certain exchange of commandos between BP and AP, for example to initiate a call from an application running on the AP, or to start an application when a call is detected by the BP. The memory controller is a digital circuit which manages the flow of data going to and from the main memory. It can be a separate chip or integrated into another chip, such as on the die of a microprocessor. This is also called a Memory Chip Controller (MCC). Memory controllers contain the logic necessary to read and write to RAM or DRAM, and to "refresh" the DRAM by sending current through the entire device. Without constant refreshes, DRAM will lose the data written to it as the capacitors leak their charge within a fraction of a second.

Reading and writing to DRAM is performed by selecting the row and column data addresses of the DRAM as the inputs to the multiplexer circuit, where the demultiplexer on the DRAM uses the converted inputs to select the correct memory location and return the data, which is then passed back through a multiplexer to consolidate the data in order to reduce the required bus width for the operation. Also the memory controller might be necessary to control the concurrent access to the RAM by different component of the device and the CPUs of the device.

While the security situation for software running on the application CPU largely follows the methods and procedures developed for desktop computers (e.g. running anti-virus software, firewalls, restrict code execution to signed applications, etc.), the security of the baseband processor has been mostly ignored so far. This is despite of the fact that the baseband CPU is a complex hardware component in an exposed position: The baseband CPU is connected on one side to the mobile network(s) and on the other side to the application CPU. All data transmissions, phone calls, SMS messages, etc. from and to the mobile networks as requested by software running on the application CPU pass through the baseband CPU.

With increasing availability of private GSM and 3G base stations, a so far largely neglected class of attacks against the security and integrity of a mobile device becomes feasible and, consequently, more widespread. This class of attacks is characterized by forcing or "seducing" the victim's mobile device to camp on a base station that is under the control of the attacker. The attacker then uses manipulated transmissions to trigger security vulnerabilities on the victim's mobile device (e.g. buffer overruns, memory corruption, stack overflows etc.) and cause the victim's mobile device to behave in ways favorable to the attacker. The attacker can for example cause the victim's mobile device to accept incoming calls without ringing or any user interaction (thus allowing the attacker to eavesdrop onto conversations held in the vicinity of the victim's phone), or let malicious software run on the baseband CPU to cause unintended behavior like monitoring of ongoing communications or exfiltration of critical data.

The security quality of the software running on today's baseband CPUs is on average rather low, as large parts of the necessary protocol stacks haven been written back in the 1990s, before secure programming guidelines were known or observed. Fixing or patching baseband software for security reasons is very seldom done by the device manufacturers. There is a multitude of reasons for this problem: The baseband chipsets are developed and manufactured by a very small group of specialized companies which typically supply both the chips and the software/firmware running on them. The baseband software is usually customized to the needs of the specific phone either by the baseband processor's manufacturer, the phone's manufacturer, or both. These relationships, interdependencies, and the question of code ownership are often complicated. The result is a situation where baseband firmware is typically only updated when there are problems with battery lifetime or data throughput. Building new baseband firmware is a process that might also involve the need to obtain new regulatory approvals from bodies like the Federal Communications Commission (FCC), which is a costly and time-consuming, such that the process may not be completed during the market life cycle of the mobile device in question.

The resulting situation is detrimental to the security and protection of the mobile device's user against the types of over-the-air-attack described above. Even when new attacks are published and become widespread, the standard simple defense strategy of applying a software update may not be available. The invention disclosed herein therefore describes the missing piece in the security armor: means and methods to mitigate and prevent these types of attacks.

SUMMARY OF INVENTION

The invention intends to provide a solution for the missing security on the baseband processor.

In order to defend against an attack on the baseband CPU, the attack first needs to be detected. As the baseband firmware itself typically contains only insufficient or no provisions for detection of attacks, a new method is required. One core idea behind the invention is to monitor the behavior of the baseband CPU, as reflected in various externally observable signs, and correlate this behavior with information about the actual intended activities of the mobile device's user. The invention consists of several components.

Method for detecting an attack on the baseband processor of a mobile device which contains a baseband processor and an application processor, which may or may not be integrated in a single chip, comprising the steps:

a) monitoring, by dedicated baseband monitor software (can also be a hardware component), the behavior of the baseband processor by using features available on the respective mobile device, b) monitoring, by a dedicated application monitor component (which can be implemented in either software or hardware), the behavior of the application processor by keeping a record of the parameters, execution time, and execution duration of legitimate software and user activities on the application processor that cause normal baseband activities as intended by the user;

c) correlating by an evaluator component (which can be implemented in either software or hardware) the baseband processor behavior with application processor behavior in order to distinguish between legitimate and suspicious/illegitimate baseband activities, d) initiation of countermeasures by a defense component (which can be implemented in either software or hardware) designed to ward off the suspicious/illegitimate baseband activities.

In a possible embodiment the data collection, aggregation and analysis of detected suspicious events from multiple mobile devices can be used by a centralized reporter monitoring component to distribute warnings to the users of either all or only a selected subset of mobile devices connected to the respective reporter component, to adjust the behavior of the evaluator mechanism of mobile devices connected to the respective reporter, and/or to initiate more extensive logging. This is done by centralized server structure which is connected to the devices over the internet.

In a possible embodiment the initiation of countermeasures designed to ward off the suspicious/illegitimate baseband activities comprises one or more of the following: resetting the baseband processor, resetting the phone, forcing all connections to be dropped. It has to be noted that this list is not limited to the listed options.

In a possible embodiment the monitoring by the baseband monitor comprises one or more of the following:
- collecting information on power consumption of individual hardware components of the mobile device,
- collecting information on audio path configuration,
- collecting information on the response time to normal service requests from the application processor to the baseband processor;
- monitoring of communication interfaces or memory areas shared between application processor and baseband processor for atypical communication patterns,
- monitoring of communication interfaces and memory areas shared between application processor and baseband for patterns associated with exploit attempts,
- collecting information obtained from the baseband processor's debugging output.

It has to be noted that this list is not limited to the listed options.

In a possible embodiment the monitoring of communication interfaces or memory areas shared between application processor and baseband processor for patterns associated with exploit attempts, comprises one or more of the following:
- Monitoring malformed messages or data structures or very large data blocks;

Monitoring the usage of procedures, functions, features or messages not seen in normal operations;

Monitoring attempts to access memory areas not consistent with normal operations.

It has to be noted that this list is not limited to the listed options.

In a possible embodiment the collecting of information obtained from the baseband processor's debugging output comprises one or more of the following:

timing and volume of voice call setup attempts,
timing and volume of data transmission,
timing and volume of SMS message transmission,
timing and sequence of establishment of traffic channels.

In a possible embodiment the evaluator component runs as an application on the application processor.

In a possible embodiment the evaluator component flags the absence of standard A5/1, A5/2, or A5/3 link encryption on GSM or 3G/UMTS/W-CDMA mobile networks which leads the defense component to issue a warning to the mobile device's user that link encryption has been deactivated.

In a possible embodiment the evaluator component flags the presence of a rogue base station that does not belong to the legitimate mobile network and the defense component warns the mobile device's user that a rogue base station (a so-called "IMSI catcher") has been detected, and/or the 'defense' component shuts down the baseband processor in order to prevent exploitation.

An IMSI catcher is essentially a false mobile tower acting between the target mobile phone(s) and the service provider's real towers. As such it is considered a Man In the Middle (MITM) attack. It is used as an eavesdropping device used for interception and tracking of cellular phones and usually is undetectable for the users of mobile phones. Such a virtual base transceiver station (VBTS) is a device for identifying the International Mobile Subscriber Identity (IMSI) of a nearby GSM mobile phone and intercepting its calls and messages.

In a possible embodiment the evaluator component flags the presence of a rogue base station that does not belong to the legitimate mobile network using one or more of the following pieces of information:

cell identification, distance, and signal strength,
signal growth/attenuation,
forced network change from 3G to 2G network,
unusual changes in the list of neighboring cells,
unusual configuration parameters of the mobile base station designed to make it appear more 'attractive' to the targeted mobile device(s),
network parameters not consistent with the mobile device's location and/or the currently selected mobile network operator It has to be noted that this list is not limited to the listed options.

In a possible embodiment the evaluator component categorizes activities on the baseband processor in different classes ranging from normal/inconspicious to highly suspicious.

In a possible embodiment the evaluator is plotting all the events in a diagram that shows baseband activity and suspectedness of baseband activities over time and displays this diagram on either the mobile device's screen or an external display device.

In a possible embodiment the evaluator component compiles the information on suspectedness of baseband activities over time in one single integrated graphical representation of the overall threat level in respect to the mobile device's baseband processor or in the form of a 'threat level thermometer' that is displayed on either the mobile device's screen or an external display device.

In a possible embodiment the evaluator component records baseband activity in a log file that can subsequently be read and combined with log files from other mobile devices by a centralized reporter component in order to arrive at an overview of the aggregated threat level to which multiple mobile devices are subject to.

In a possible embodiment the evaluator component transmits data on baseband activity and network parameters to a remote reporter entity which performs additional location-based analytics to determine the locations of hostile networks.

In a possible embodiment the reporter remote analytics entity sends out warnings and configuration changes to either all or only a selected subset of mobile devices in respect to detected hostile network activity (e.g. based on the mobile devices' location and the location of areas where over-the-air attacks heap up).

In a possible embodiment the reporter remote analytics entity sends out warnings about hostile network activity to dedicated connected devices which are mounted as stationary sensors in sensitive areas for the primary purpose of informing users who do not have the baseband monitor component installed on their mobile devices about ongoing suspicious/illegitimate activities.

In a possible embodiment mobile devices are connected to the centralized reporter monitoring component via a direct wireless data connection, or via a synchronization mechanism that is activated whenever the phone is connected to a desktop computer to synchronize data with it.

In a possible embodiment the central reporter component can adjust the behavior of the evaluator mechanism of mobile devices connected to the respective reporter component (e.g. by lowering the suspiciousness level before countermeasures are initiated, or initiating more extensive logging).

In a possible embodiment the defense component runs as an application on the application processor.

In the following an example will be discussed. If the baseband monitor component detects an ongoing call by monitoring the baseband processor, while at the same time, the application monitor component reports that the telephony software running on the application CPU has not initiated or accepted a call, then the evaluator mechanism will determine that the likelihood of malicious baseband behavior is high, and that this is very likely the result of an attack.

In an alternative embodiment the invention provides a method to analyze the security of a mobile terminal, comprising an application processor (AP), a baseband processor (BP), the AP and the BP exchange information. The method comprises the steps:

a) acquiring by a Baseband-monitor application and an Application-monitor application running on the mobile device one or more of the following information:

Information from the BP about opening and closing of transmission channels to and from a base station;
Information from the baseband CPU about protocol transmissions to and from the base station;
Information from the baseband CPU about the volume of data transmission;
Measurement data of response times to standard service requests from application CPU (AP) to baseband CPU (BP);
Information on the power consumption of phone components;
Information on the current voltage delivered by the battery to the phone;
Configuration of the audio path, to determine which component or application is using the micro-phone;

Monitor the running applications on the AP;
Monitor the status of the running applications on the AP;
Monitor time or duration of applications running on the AP;
Monitor the input or output of the applications running on the AP;
Monitor the input of a user to a User-Interfaces.

The information is stored in a possible embodiment in a database or container which can be accessed by a correlation engine to find correlations between at least two pieces of information above that indicate an unsecure situation, and triggering an alarm.

In a possible embodiment the Baseband-monitor application acquires one or more of the following information:
Information from the BP about opening and closing of transmission channels to and from a base station;
Information from the baseband CPU about protocol transmissions to and from the base station;
Information from the baseband CPU about the volume of data transmission;
Measures response times to standard service requests from application CPU (AP) to baseband CPU (BP).

Furthermore the application monitor application acquires one or more of the following information:
Information of the power consumption of phone components;
Information of the current and voltage delivered by the battery to the phone;
Monitors the audio path configuration, by determining which component or application is using the microphone;
Monitor the running applications on the AP;
Monitor the status of the running applications on the AP;
Monitor time or duration of applications running on the AP;
Monitor the input or output of the applications running on the AP;
Monitor the input of a user to a User-Interface;

All these pieces of information are used to find a correlation between the information of the baseband-monitor application and the information of the application-monitor-application, that indicate an unsecure situation, and triggering an alarm.

In a possible embodiment a correlation is defined being likely secure for one or more of the following:
if the user inputs information to a User-Interface and an application is running which is defined as the receiver of the information inputted, and network connection on the BP is opened after the inputted information;
if a web-browser application is started or activated and user input is detected which is directed to the web-browser application and a IP-Session is opened by the BP;
if an email-application is running and is checking for new emails and an IP-Session is opened by the BP;
if a phone call application is started, user input is detected, and a voice session is opened by the BP;
if a phone call application is started and has opened a voice connection over the BP a speaker path to the phone call application is allowed;
if an instant messaging communication is initiated or received by the user and an IP-Session is opened by the BP;
if software or system updates are initiated by the user or authorized system services, and an IP-Session is opened by the BP.

In a possible embodiment a correlation is defined being likely unsecure for one or more of the following:
if a phone call is ongoing while no phone call is made or accepted by the phone call application or telephony application;
if the microphone is active and a phone call is ongoing over the BP while no phone call is made accepted by the phone call application or telephony application;
if the microphone is assigned to an application that is not allowed to have access to the microphone and which transfers data over the BP as a phone call or a IP-Session;
if the mobile device is an idle or sleep mode, while large amount of data from the storage device of the phone is transferred over a IP-session opened by the BP;
if the actual power consumption is larger than the displayed power consumption and a IP-session is opened by the BP to transfer data;
if the actual power differs from the expected power consumption and a IP-session or phone calls is ongoing over the BP.

In a possible embodiment a correlation engine defines and maintains pattern of secure and unsecure states is then matched against the currently present data by mathematical correlation methods, including but not limited to neural networks and statistical deviation analysis.

In a possible embodiment power consumption is analyzed by mathematical subtraction of the area under the curve for battery discharge and if the area of the expected discharge curve as computed on the base of application and operating system power usage deviates significantly from the actually measured discharge curve, the resulting area under the curve is large and an IP-session or phone call is ongoing over the BP an alarm is triggered.

In a possible embodiment a user setting is provided allowing the configuration of the sensitivity of the alarm and attack countermeasure routines, so the user is not overwhelmed by false alarms.

In a possible embodiment in case of the alarm the BP is reset, the mobile device is reset or all connections are forced to be dropped.

A further part of the invention is Mobile terminal comprising an application processor (AP), a baseband processor (BP), the AP and the BP exchange information, comprising a Baseband-monitor application and an Application-monitor application running on the AP or BP, the monitor applications are configured to collect one or more of the following information:
Information from the BP about opening and closing of transmission channels to and from a base station;
Information from the baseband CPU about protocol transmissions to and from the base station;
Information from the baseband CPU about the volume of data transmission;
Measures response times to standard service requests from application CPU (AP) to baseband CPU (BP);
Information of the power consumption of phone components;
Information of the current and voltage delivered by the battery to the phone;
Configuration of the audio path, to determine which component or application is using the micro-phone;
Monitor the running applications on the AP;
Monitor the status of the running applications on the AP;
Monitor time or duration of applications running on the AP;

Monitor the input or output of the applications running on the AP;
Monitor the input of a user to a User-Interfaces;
further comprising a correlation application being configured to find correlations between at least two information above that indicate an unsecure situation, and triggering an alarm.

In a possible embodiment of the mobile terminal the Baseband-monitor application acquires one or more of the following information:
Information from the BP about opening and closing of transmission channels to and from a base station;
Information from the baseband CPU about protocol transmissions to and from the base station;
Information from the baseband CPU about the volume of data transmission;
Measures response times to standard service requests from application CPU (AP) to baseband CPU (BP);
and wherein the application monitor application acquires one or more of the following information:
Information of the power consumption of phone components;
Information of the current and voltage delivered by the battery to the phone;
Monitors the audio path configuration, by determining which component or application is using the microphone;
Monitor the running applications on the AP;
Monitor the status of the running applications on the AP;
Monitor time or duration of applications running on the AP;
Monitor the input or output of the applications running on the AP;
Monitor the input of a user to a User-Interface;
and the correlation application is configured to find correlation between the information of the baseband-monitor application and the information of the application-monitor-application, above that indicate an unsecure situation, and triggering an alarm.

In a possible embodiment of the mobile terminal a correlation is defined being likely secure for one or more of the following:
if the user inputs information to a User-Interface and an application is running which is defined as the receiver of the information inputed, and network connection on the BP is opened after the inputted information;
if a web-browser application is started or activated and user input is detected which is directed to the web-browser application and a IP-Session is opened by the BP;
if a email-application is running and is checking for new emails and an IP-Session is opened by the BP;
if a phone call application is started user input is detected and a voice session is opened by the BP;
if a phone call application is started and has opened a voice connection over the BP an speaker path to the phone call application is allowed;
if an instant messaging communication is initiated or received by the user and an IP-Session is opened by the BP;
if software or system updates are initiated by the user or authorized system services, and an IP-Session is opened by the BP.

In a possible embodiment of the mobile terminal a correlation is defined being likely unsecure for one or more of the following:
if a phone call is ongoing while no phone call is made or accepted by the phone call application or telephony application;
if the microphone is active and a phone call is ongoing over the BP while no phone call is made accepted by the phone call application or telephony application;
if the microphone is assigned to an application that is not allowed to have access to the microphone and which transfers data over the BP as a phone call or a IP-Session;
if the mobile device is an idle or sleep mode, while large amount of data from the storage device of the phone is transferred over a IP-session opened by the BP;
if the actual power consumption is larger than the displayed power consumption and a IP-session is opened by the BP to transfer data;
if the actual power differs from the expected power consumption and a IP-session or phone calls is ongoing over the BP.

In a possible embodiment of the mobile terminal the correlation engine is configured to define and maintain pattern of secure and unsecure states, which are then matched against the currently present data by mathematical correlation methods, including but not limited to neural networks and statistical deviation analysis.

In a possible embodiment of the mobile terminal a Power consumption is analyzed by mathematical subtraction of the area under the curve for battery discharge and If the area of the expected discharge curve as computed on the base of application and operating system power usage deviates significantly from the actually measured discharge curve, the resulting area under the curve is large and a IP-session or phone calls is ongoing over the BP an alarm is triggered.

In a possible embodiment of the mobile terminal the correlation engine is configured to provide a user setting allowing the configuration of the sensitivity of the alarm and attack countermeasure routines, so the user is not overwhelmed by false alarms.

In a possible embodiment of the mobile terminal wherein in case of the alarm the BP is reset, the mobile device is reset or all connections are forced to be dropped.

Another aspect of the invention is a mobile device, that implements the above mentioned aspects. The Mobile device configured to detect an attack on a baseband processor comprising a baseband processor and an application processor, which may or may not be integrated in a single chip, comprising:
a) baseband monitor component configured to monitor the behavior of the baseband processor by using features available on the respective mobile device.
b) application monitor component configured to monitor the behavior of the application processor by keeping a record of the parameters, execution time or execution duration of legitimate software or user activities on the application processor that cause normal baseband activities as intended by the user;
c) evaluator component configured to correlate the baseband processor behavior with application processor behavior in order to distinguish between legitimate and suspicious/illegitimate baseband activities,
d) defense component configured to initiate component of countermeasures designed to ward off the suspicious/illegitimate baseband activities.

The other possible configurations of the mobile device which are described in the appended claims implement the method above.

It has to be noted, that the components mentioned above can be software or hardware, in case of software they run on the application processors or on the baseband processor or partially on both.

Also the applications can run on the BP or AP, or partially on the AP or BP, can be implemented in hardware or software or a combination thereof.

The invention consists in a possible configuration of the following components: One component is a Baseband-Monitor that observes the behavior of the baseband. It uses all means available to determine the current behavior of the Baseband Processor (BP). The Baseband-Monitor is an application which preferable runs as application on the application processor (AP). It is also possible that parts of the Baseband-Monitor runs as application on the BP. Baseband-Monitor in the preferred embodiment uses the interfaces and functions the of the BP, which are provide by in the standard configuration. The information and the interfaces available differs depending on capabilities of the baseband processor and interfaces made available on a specific phone model/mobile terminal and includes but is not limited to:
1. Information from the baseband CPU about opening and closing of transmission channels to and from a base station.
2. Information from the baseband CPU about protocol transmissions to and from the base station.
3. Information from the baseband CPU about the volume of data transmission. Further the Baseband-Monitor
4. Monitors and records the power consumption of phone components (as available).
5. Records the current and voltage delivered by the battery to the phone.
6. Monitors the audio path configuration (e.g. which component is using the microphone).
7. Measures response times to normal service requests from application CPU (AP) to baseband CPU (BP).

Using these data points the Baseband-Monitor provides a rich set of information on the current activities of the baseband. The level of detail depends on the availability of data sources in the specific phone model. Not all data sources are usually available on all phone models.

The other component of the invention in the possible configuration of two components is a monitoring and alerting component that observes the parameters, time and duration of legitimate software and user activities on the application CPU that cause normal Baseband activities intended by the user. Under normal circumstances, most Baseband activities with some known exceptions are correlated with user interaction, like making a call or loading a web page, or known-to-be-good automated application activity, like checking e-mail. Application use of baseband resources is monitored on the AP by various means like hooking or replacing the respective "provider" functions in the operating system that manage the communication with the baseband. This analyses can also be performed by checking the network traffic for example by sniffing the ports and the IP-packages, or by using proxies which are located between the applications and the baseband. Also the communication between the AP and BP can be monitored by reading the shared memory which is normally used for an information exchange between the two units. Also the activity for example the processor using of the applications can be monitored to detect if the application is very active or suspended. So the information of the process scheduler in the operating system can provide information. Also the event table of the operating system can be check and verified. In the event table the applications running on the AP give a feedback of the actions and errors and warnings.

Also a monitoring on the AP can be given by tracking the use of a user interface like a keyboard or a touch screen. For example if a SMS has been send by an application without a detection of a user input a security problem can be given. The same situation can be determined if the mobile terminal is in a standby mode and a SMS is sent or phone call is performed. The monitoring application on the AP collects this information and stores the information over a defined time period in a database. The storing and collecting of the information is done in defined time intervals or driven by events like interrupts. Each collected information has in a possible implementation a time stamp which allows finding a time correlation. Furthermore the information can be categorized which allows the implementation of general concepts and rules on the categories.

The mechanism then correlates the data from the Baseband monitoring (described above) and the data from the application CPU monitoring to distinguish between legitimate and suspicious Baseband activities. Suspicious are activities that cause transmissions or resource consumption on the Baseband but are not correlated to legitimate user activities. One very simple example is that if the Baseband is detected by the monitoring component to have an active call ongoing while no phone call is made or accepted by the telephony software, very likely this is the result of an attack.

The correlation engine of the invention builds a pattern of "normality" that is then matched against the currently present data by mathematical correlation methods, including but not limited to neural networks and statistical deviation analysis etc. A simple example is the analysis of the battery discharge curve while taking into account the power usage of applications and sensors as provided by the operating system or seperate readout of power consumption data from respective phone sensors. If the actual discharge curve deviates from the expected pre-calculated discharge curve, malicious baseband activity is suspected. These statistical concepts are well known so that a further discussion can be omitted. Also logical dependencies can be expressed by definable expression, using conditional expression and logical conjunctions etc. The detection of ongoing suspicious baseband activity can rely on one or a combination of data sources on Baseband and application CPU. Specific user usage patterns are taken into account by an adaption mechanism built into the correlation engine. A user setting is provided to allow for a configuration of the sensitivity of the alarm and attack countermeasure routines, so the user is not overwhelmed by false alarms.

In the most simple case when very little data is available to the Baseband Monitor, the battery current and voltage measurement is used to check for a deviation from the expected power consumption. An ongoing attack that would e.g. use the baseband to transmit room audio to the attacker by means of a surreptitious call or periodic data transmissions would cause a deviation between power consumption actually measured at the battery and the expected consumption computed from the phones power profile.

When suspicious activity is detected in the form of deviation between expected and actual power use, open channels to the base station, data transmission, audio circuit configuration, response times etc. countermeasures can be taken for instance but not limited to resetting the baseband, resetting the phone, forcing all connections to be dropped and/or alerting the phones user.

BRIEF DESCRIPTION OF DRAWINGS

The Figures show examples of possible implementations but do not intend to limit the application on these embodiments. Consequently the scope of protection has to be determined by the broadest interpretation of the claims.

DETAILED DESCRIPTION OF THE EMBODIMENTS

Figure 1:
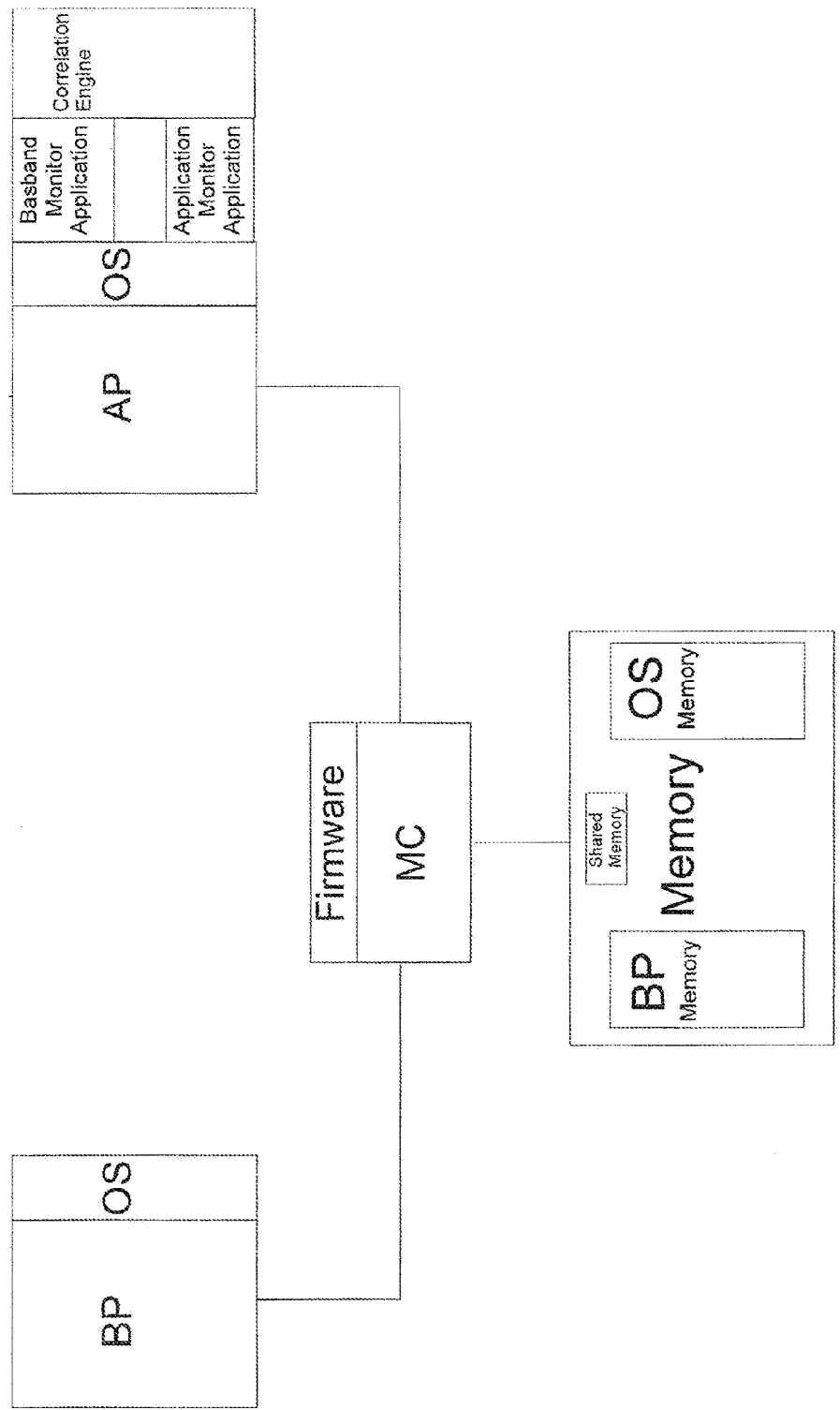
FIG. 1 shows a structure of components and their connection.

FIG. 1 discloses a structure of a mobile device with a BP running an operating system OS and with an AP running an OS. On the OS of the AP an application monitor application is running which implements the collection of information. Furthermore the baseband monitor application is running on the AP collecting information. The information are used by a correlation engine application which has access to the collected information. A memory controller MC is controlled by a firmware/program. The MC is connected to the memory and controls a memory that is logical divided into shared memory, AP memory and BP memory. The logical separation is provided by the memory controller and the firmware. The memory controller is connected to the BP and AP.

Figure 2:
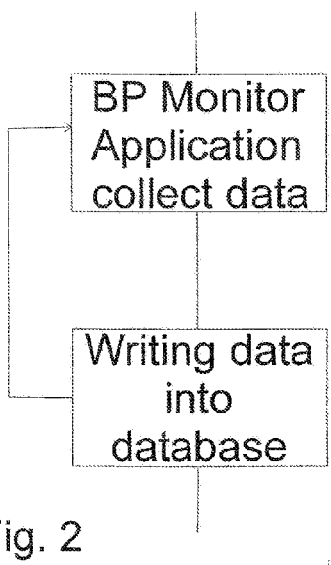
FIG. 2 shows the flow diagram of the method AP monitor application.
Figure 3:
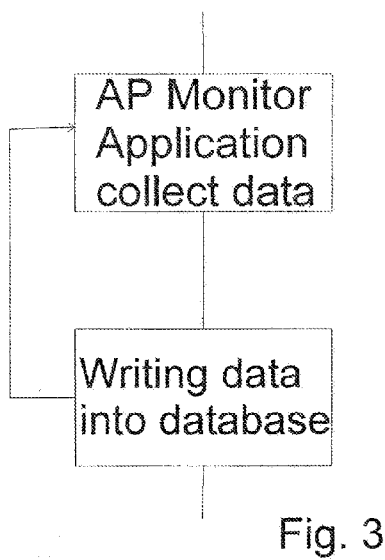
FIG. 3 shows the flow diagram of the method BP monitor application.
Figure 4:
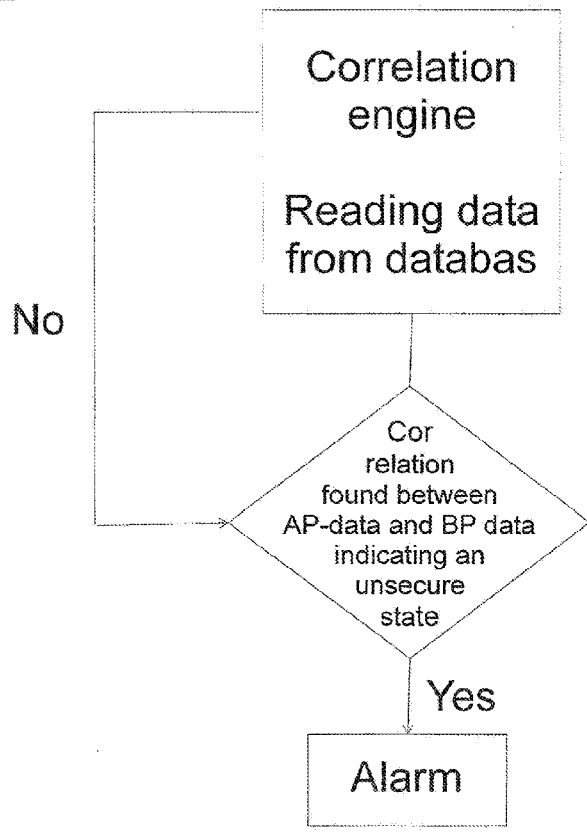
FIG. 4 shows the flow diagram of the method correlation engine.

FIG. 2 shows a flow diagram of the application monitor that collects specific data and stores the date in a database. The data can be collected cyclic or event driven. FIG. 3 shows a flow diagram of the baseband monitor application that collects specific data and stores the date in a database. The data can be collected cyclic or event driven. FIG. 4 shows a flow diagram of the correlation that has access to the database and reads the information to find unsecure patterns by finding the unsecure correlation. In case of finding a unsecure correlation an alarm is triggered.

What is claimed:

1. A method of detecting an attack on a baseband processor of a mobile device comprising the baseband processor and an application processor, which may or may not be integrated in a single chip, comprising the steps of:
   a) monitoring by a baseband monitor component the behavior of the baseband processor by using features available on the mobile device,
   b) monitoring by an application monitor component the behavior of the application processor by keeping a record of the parameters, execution time or execution duration of legitimate software or user activities on the application processor that constitute normal baseband activities by the user;
   c) correlating by an evaluator component the baseband processor behavior with application processor behavior in order to distinguish between legitimate and suspicious baseband activities, and
   d) initiating by a defense component countermeasures designed to ward off the suspicious baseband activities, wherein initiating includes one or more of resetting the baseband processor, resetting the mobile device or forcing all mobile device connections to be dropped.

2. A method of detecting an attack on a baseband processor of a mobile device comprising the baseband processor and an application processor, which may or may not be integrated in a single chip, comprising the steps of:
   a) monitoring by a baseband monitor component the behavior of the baseband processor by using features available on the mobile device,
   b) monitoring by an application monitor component the behavior of the application processor by keeping a record of the parameters, execution time or execution duration of legitimate software or user activities on the application processor that constitute normal baseband activities by the user,
   c) correlating by an evaluator component the baseband processor behavior with application processor behavior in order to distinguish between legitimate and suspicious baseband activities, and
   d) initiating by a defense component countermeasures designed to ward off the suspicious baseband activities, wherein the monitoring by the baseband monitor further comprises one or more of the following:
      collecting information on power consumption of individual hardware components of the mobile device,
      collecting information on audio path configuration,
      collecting information on the response time to normal service requests from the application processor to the baseband processor,
      monitoring of communication interfaces or memory areas shared between the application processor and the baseband processor for atypical communication patterns,
      monitoring of communication interfaces and memory areas shared between the application processor and the baseband for patterns associated with exploit attempts, or
      collecting information obtained from the baseband processor's debugging output.

3. The method according to claim 2, wherein the monitoring of communication interfaces or memory areas shared between the application processor and the baseband processor for patterns associated with exploit attempts, comprises one or more of the following:
   Monitoring malformated messages or data structures or very large data blocks;
   Monitoring the usage of procedures, functions, features or messages not seen in normal operations; or
   Monitoring attempts to access memory areas not consistent with normal operations.

4. The method according claim 2, wherein the collecting of information obtained from the baseband processor's debugging output comprises one or more of the following:
   timing and volume of voice call setup,
   timing and volume of data transmission,
   timing and volume of SMS message transmission, or
   timing and sequence of establishment of traffic channels.

5. A method of detecting an attack on a baseband processor of a mobile device comprising the baseband processor and an application processor, which may or may not be integrated in a single chip, comprising the steps of:
   a) monitoring by a baseband monitor component the behavior of the baseband processor by using features available on the mobile device,
   b) monitoring by an application monitor component the behavior of the application processor by keeping a record of the parameters, execution time or execution duration of legitimate software or user activities on the application processor that constitute normal baseband activities by the user;
   c) correlating by an evaluator component the baseband processor behavior with application processor behavior in order to distinguish between legitimate and suspicious baseband activities, and
   d) initiating by a defense component countermeasures designed to ward off the suspicious baseband activities, wherein the evaluator component flags the absence of standard A5/1, A5/2, or A5/3 link encryption on GSM or 3G/UMTS/W-CDMA mobile networks which leads the defense component to issue a warning to the mobile device's user that link encryption has been deactivated.

6. A method of detecting an attack on a baseband processor of a mobile device comprising the baseband processor and an application processor, which may or may not be integrated in a single chip, comprising the steps of:
 a) monitoring by a baseband monitor component the behavior of the baseband processor by using features available on the mobile device,
 b) monitoring by an application monitor component the behavior of the application processor by keeping a record of the parameters, execution time or execution duration of legitimate software or user activities on the application processor that constitute normal baseband activities by the user;
 c) correlating by an evaluator component the baseband processor behavior with application processor behavior in order to distinguish between legitimate and suspicious baseband activities, and
 d) initiating by a defense component countermeasures designed to ward off the suspicious baseband activities, wherein the evaluator component flags the presence of a rogue base station that does not belong to the legitimate mobile network and the defense component warns the user of the mobile device that a rogue base station has been detected and/or the defense component shuts down the baseband processor in order to prevent exploitation.

7. The method according to claim 6 wherein the evaluator component flags the presence of a rogue base station that does not belong to the legitimate mobile network using one or more of the following:
 cell identification, distance, and signal strength,
 signal growth/attenuation,
 forced network change from 3G to 2G network,
 unusual changes in the list of neighboring cells,
 unusual configuration parameters of the mobile base station designed to make it appear more 'attractive' to the targeted mobile device(s), or
 network parameters not consistent with the mobile device's location and/or the currently selected mobile network operator.

8. A method of detecting an attack on a baseband processor of a mobile device comprising the baseband processor and an application processor, which may or ma not be integrated in a single chip, comprising the steps of:
 a) monitoring by a baseband monitor component the behavior of the baseband processor by using features available on the mobile device,
 b) monitoring by an application monitor component the behavior of the application processor by keeping a record of the parameters, execution time or execution duration of legitimate software or user activities on the application processor that constitute normal baseband activities by the user;
 c) correlating by an evaluator component the baseband processor behavior with application processor behavior in order to distinguish between legitimate and suspicious baseband activities, and
 d) initiating by a defense component countermeasures designed to ward off the suspicious baseband activities, wherein the evaluator component categorizes activities on the baseband processor in different classes ranging from normal/inconspicuous to highly suspicious.

9. The method according to claim 8, wherein the evaluator plots events in a diagram that shows baseband activity and suspect baseband activities over time, wherein the diagram is displayed on either the mobile device's screen or an external display device.

10. The method according to claim 9, wherein the evaluator component compiles the suspect baseband activities over time in one single integrated graphical representation of the overall threat level with respect to the mobile device's baseband processor or in the form of a 'threat level thermometer' that is displayed on either the mobile device's screen or an external display device.

11. A method of detecting an attack on a baseband processor of a mobile device comprising the baseband processor and an application processor, which may or may not be integrated in a single chip, comprising the steps of:
 a) monitoring by a baseband monitor component the behavior of the baseband processor by using features available on the mobile device,
 b) monitoring by an application monitor component the behavior of the application processor by keeping a record of the parameters, execution time or execution duration of legitimate software or user activities on the application processor that constitute normal baseband activities by the user;
 c) correlating by an evaluator component the baseband processor behavior with application processor behavior in order to distinguish between legitimate and suspicious baseband activities, and
 d) initiating by a defense component countermeasures designed to ward off the suspicious baseband activities, wherein the evaluator component records baseband activity in a log file that can be subsequently read and combined with log files from other mobile devices by a reporter component in order to arrive at an overview of the aggregated threat level to which multiple mobile devices are subject to.

12. A method of detecting an attack on a baseband processor of a mobile device comprising, the baseband processor and an application processor, which may or may not be integrated in a single chip, comprising the steps of:
 a) monitoring by a baseband monitor component the behavior of the baseband processor by using features available on the mobile device,
 b) monitoring by an application monitor component the behavior of the application processor by keeping a record of the parameters, execution time or execution duration of legitimate software or user activities on the application processor that constitute normal baseband activities by the user;
 c) correlating by an evaluator component the baseband processor behavior with application processor behavior in order to distinguish between legitimate and suspicious baseband activities, and
 d) initiating by a defense component countermeasures designed to ward off the suspicious baseband activities, wherein the evaluator component transmits data on baseband activity and network parameters to a remote reporter entity which performs additional location-based analytics to determine the locations of hostile networks.

13. The method according to claim 12, wherein the remote reporter entity sends out warnings and configuration changes to mobile devices in response to detected hostile network activity.

14. The method according to claim 13, wherein the remote reporter entity sends out warnings about hostile network activity dedicated connected devices which are mounted as stationary sensors in sensitive areas for the primary purpose of informing users who do not have the baseband monitor component installed on their mobile devices about ongoing activities.

15. A mobile device comprising a baseband processor and an application processor, which may or may not be integrated in a single chip, comprising:
  a) a baseband monitor component configured to monitor the behavior of the baseband processor by using features available on the mobile device,
  b) an application monitor component configured to monitor the behavior of the application processor by keeping a record of the parameters, execution time or execution duration of legitimate software or user activities on the application processor that constitute normal baseband activities by the user;
  c) an evaluator component configured to correlate the baseband processor behavior with application processor behavior in order to distinguish between legitimate and suspicious baseband activities, and
  d) a defense component configured to initiate defense component countermeasures designed to ward off the suspicious baseband activities, wherein the countermeasures designed to ward off the suspicious baseband activities comprise one or more of resetting the baseband processor, resetting the phone or forcing all mobile device connections to be dropped.

16. A mobile device comprising a baseband processor and an application processor, which may or may not be integrated in a single chip, comprising:
  a) a baseband monitor component configured to monitor the behavior of the baseband processor by using features available on the mobile device,
  b) an application monitor component configured to monitor the behavior of the application processor by keeping a record of the parameters, execution time or execution duration of legitimate software or user activities on the application processor that constitute normal baseband activities by the user;
  c) an evaluator component configured to correlate the baseband processor behavior with application processor behavior in order to distinguish between legitimate and suspicious baseband activities, and
  d) a defense component configured to initiate defense component countermeasures designed to ward off the suspicious baseband activities, wherein the baseband monitor component is configured to implement one or more of the following:
    collecting information on power consumption of individual hardware components of the mobile device,
    collecting information on audio path configuration,
    collecting information on the response time to normal service requests from the application processor to the baseband processor,
    monitoring of communication interfaces or memory areas shared between the application processor and the baseband processor for atypical communication patterns,
    monitoring of communication interfaces and memory areas shared between the application processor and the baseband for patterns associated with exploit attempts, or
    collecting information obtained from the baseband processor's debugging output.

17. The mobile device according to claim 16, wherein the monitoring of communication interfaces or memory areas shared between the application processor and the baseband processor for patterns associated with exploit attempts, comprises one or more of the following:
    Monitoring malformed messages or data structures or very large data blocks;
    Monitoring the usage of procedures, functions, features or messages not seen in normal operations; or
    Monitoring attempts to access memory areas not consistent with normal operations.

18. The mobile device according to claim 16, wherein the collecting of information obtained from the baseband processor's debugging output comprises one or more of the following:
    timing and volume of voice call setup,
    timing and volume of data transmission,
    timing and volume of SMS message transmission, or
    timing and sequence of establishment of traffic channels.

19. A mobile device comprising a baseband processor and an application processor, which may or may not be integrated in a single chip, comprising:
  a) a baseband monitor component configured to monitor the behavior of the baseband processor by using features available on the mobile device,
  b) an application monitor component configured to monitor the behavior of the application processor by keeping a record of the parameters, execution time or execution duration of legitimate software or user activities on the application processor that constitute normal baseband activities by the user;
  c) an evaluator component configured to correlate the baseband processor behavior with application processor behavior in order to distinguish between legitimate and suspicious baseband activities, and
  d) a defense component configured to initiate defense component countermeasures designed to ward off the suspicious baseband activities, wherein the evaluator component is configured to flag the absence of standard A5/1; A5/2, or A5/3 link encryption on GSM or 3G/UMTS/W-CDMA mobile networks which leads the defense component to issue a warning to the mobile device's user that link encryption has been deactivated.

20. A mobile device comprising a baseband processor and an application processor, which may or may not be integrated in a single chip, comprising:
  a) a baseband monitor component configured to monitor the behavior of the baseband processor by using features available on the mobile device,
  b) an application monitor component configured to monitor the behavior of the application processor by keeping a record of the parameters, execution time or execution duration of legitimate software or user activities on the application processor that constitute normal baseband activities by the user;
  c) an evaluator component configured to correlate the baseband processor behavior with application processor behavior in order to distinguish between legitimate and suspicious baseband activities, and
  d) a defense component configured to initiate defense component countermeasures designed to ward off the suspicious baseband activities, wherein the evaluator component is configured to flag the presence of a rogue base station that does not belong to the legitimate mobile network and the defense component warns the user of the mobile device that a rogue base station has been detected and/or the defense component shuts down the baseband processor in order to prevent exploitation.

21. The mobile device according to claim 20 wherein the evaluator component is configured to flag the presence of a rogue base station that does not belong to the legitimate mobile network using one or more of the following:
cell identification, distance, and signal strength,
signal growth/attenuation,
forced network change from 3G to 2G network,
unusual changes in the list of neighboring cells,
unusual configuration parameters of the mobile base station designed to make it appear more 'attractive' to the targeted mobile device(s), or
network parameters not consistent with the mobile device's location and/or the currently selected mobile network operator.

22. A mobile device comprising a baseband processor and an application processor, which may or may not be integrated in a single chip, comprising:
a) a baseband monitor component configured to monitor the behavior of the baseband processor by using features available on the mobile device,
b) an application monitor component configured to monitor the behavior of the application processor by keeping a record of the parameters, execution time or execution duration of legitimate software or user activities on the application processor that constitute normal baseband activities by the user;
c) an evaluator component configured to correlate the baseband processor behavior with application processor behavior in order to distinguish between legitimate and suspicious baseband activities, and
d) a defense component configured to initiate defense component countermeasures designed to ward off the suspicious baseband activities wherein the evaluator component is configured to categorizes activities on the baseband processor in different classes ranging from normal/inconspicuous to highly suspicious.

23. The mobile device according to claim 22, wherein the evaluator is configured to plot events in a diagram that shows baseband activity and of suspect baseband activities over time, wherein the diagram is displayed on either the mobile device's screen or an external display device.

24. The mobile device according to claim 23, wherein the evaluator component is configured to compile the suspect baseband activities over time in one single integrated graphical representation of the overall threat level with respect to the mobile device's baseband processor or in the form of a 'threat level thermometer' that is displayed on either the mobile device's screen or an external display device.

25. A mobile device comprising a baseband processor and an application processor, which may or may not be integrated in a single chip, comprising:
a) a baseband monitor component configured to monitor the behavior of the baseband processor by using features available on the mobile device,
b) an application monitor component configured to monitor the behavior of the application processor by keeping a record of the parameters, execution time or execution duration of legitimate software or user activities on the application processor that constitute normal baseband activities by the user;
c) an evaluator component configured to correlate the baseband processor behavior with application processor behavior in order to distinguish between legitimate and suspicious baseband activities, and
d) a defense component configured to initiate defense component countermeasures designed to ward off the suspicious baseband activities, wherein the evaluator component is configured to record baseband activity in a log file that can be subsequently read and combined with log files from other mobile devices by a reporter component in order to arrive at an overview of the aggregated threat level to which multiple mobile devices are subject to.

26. A mobile device comprising a baseband processor and an application processor, which may or may not be integrated in a single chip, comprising:
a) a baseband monitor component configured to monitor the behavior of the baseband processor by using features available on the mobile device,
b) an application monitor component configured to monitor the behavior of the application processor by keeping a record of the parameters, execution time or execution duration of legitimate software or user activities on the application processor that constitute normal baseband activities by the user;
c) an evaluator component configured to correlate the baseband processor behavior with application processor behavior in order to distinguish between legitimate and suspicious baseband activities, and
d) a defense component configured to initiate defense component countermeasures designed to ward off the suspicious baseband activities, wherein the evaluator component is configured to transmit data on baseband activity and network parameters to a remote reporter entity which performs additional location-based analytics to determine the locations of hostile networks.

27. The mobile device according to claim 26, wherein the remote reporter entity is configured to send out warnings and configuration changes to mobile devices in response to detected hostile network activity.

28. The mobile device according to claim 27, wherein the remote reporter entity is configured to send out warnings about hostile network activity to dedicated connected devices which are mounted as stationary sensors in sensitive areas for the primary purpose of informing users who do not have the baseband monitor component installed on their mobile devices about ongoing suspicious activities.

29. A method of detecting an attack on a baseband processor of a mobile device comprising the baseband processor and an application processor, which may or may not be integrated in a single chip, comprising the steps of:
a) monitoring by a baseband monitor component the behavior of the baseband processor by using features available on the mobile device;
b) monitoring by an application monitor component the behavior of the application processor by keeping a record of the parameters, execution time or execution duration of legitimate software or user activities on the application processor that constitute normal baseband activities by the user; and
c) correlating by an evaluator component the baseband processor behavior with application processor behavior in order to distinguish between legitimate and suspicious baseband activities;
wherein the monitoring by the baseband monitor component further comprises one or more of the following:
collecting information on power consumption of individual hardware components of the mobile device,
collecting information on audio path configuration,
collecting information on the response time to normal service requests from the application processor to the baseband processor;
monitoring of communication interfaces or memory areas shared between the application processor and the baseband processor for atypical communication patterns, monitoring of communication interfaces and memory areas shared between the application processor and the baseband for patterns associated with exploit attempts, or collecting information obtained from the baseband processor's debugging output.

30. A mobile device comprising a baseband processor and an application processor, which may or may not be integrated in a single chip, comprising:
 a) a baseband monitor component configured to monitor the behavior of the baseband processor by using features available on the mobile device;
 b) an application monitor component configured to monitor the behavior of the application processor by keeping a record of the parameters, execution time or execution duration of legitimate software or user activities on the application processor that constitute normal baseband activities by the user; and
 c) an evaluator component configured to correlate the baseband processor behavior with application processor behavior in order to distinguish between legitimate and suspicious baseband activities;
wherein the baseband monitor component configured to implement one or more of the following:
 collecting information on power consumption of individual hardware components of the mobile device,
 collecting information on audio path configuration,
 collecting information on the response time to normal service requests from the application processor to the baseband processor;
 monitoring of communication interfaces or memory areas shared between the application processor and the baseband processor for atypical communication patterns,
 monitoring of communication interfaces and memory areas shared between the application processor and the baseband for patterns associated with exploit attempts, or
 collecting information obtained from the baseband processor's debugging output.

* * * * *